US012647783B2

(12) United States Patent (10) Patent No.: US 12,647,783 B2
Sharma et al. (45) Date of Patent: Jun. 2, 2026

(54) METHOD AND SYSTEM FOR AUTOMATED SECURE DEVICE REGISTRATION AND PROVISIONING OVER CELLULAR OR WIRELESS NETWORK

(71) Applicant: Aeris Communications, Inc., San Jose, CA (US)

(72) Inventors: Narendra Sharma, Sunnyvale, CA (US); Drew S. Johnson, San Jose, CA (US); Karan Kapoor, New Delhi (IN)

(73) Assignee: Aeris Communications Inc., Chicago, IL (US)

( * ) Notice: Subject to any disclaimer, the term of this patent is extended or adjusted under 35 U.S.C. 154(b) by 437 days.

(21) Appl. No.: 17/943,351

(22) Filed: Sep. 13, 2022

(65) Prior Publication Data

US 2023/0078765 A1 Mar. 16, 2023

Related U.S. Application Data

(60) Provisional application No. 63/243,930, filed on Sep. 14, 2021.

(51) Int. Cl.
*H04W 4/50* (2018.01)
*H04W 4/70* (2018.01)
(Continued)

(52) U.S. Cl.
CPC ........... *H04W 12/069* (2021.01); *H04W 4/50* (2018.02); *H04W 4/70* (2018.02); *H04W 12/40* (2021.01); *H04W 12/71* (2021.01); *H04W 12/72* (2021.01)

(58) Field of Classification Search
CPC ... H04W 12/069; H04W 12/40; H04W 12/71; H04W 12/72; H04W 12/35; H04W 12/06;
(Continued)

(56) References Cited

U.S. PATENT DOCUMENTS 8,996,002 B2 3/2015 Rodgers
9,705,546 B2 7/2017 Lee
(Continued)

FOREIGN PATENT DOCUMENTS

WO WO-2009106265 A1 * 9/2009 ............. H04M 3/38
WO WO-2018/141665 A1 * 8/2018 ............. H04L 5/14
WO WO-2021259751 A1 * 12/2021 ............ H04W 12/35

OTHER PUBLICATIONS

S. Chitroub, D. Blaid, H. Aouadia and R. Laouar, "Securing Mobile IoT Deployment Using Embedded SIM: Concerns and Solutions, " 2019 International Conference on Internet of Things, Embedded Systems and Communications (IINTEC), Tunis, Tunisia, 2019, pp. 75-79 (Year: 2019).*

(Continued)

*Primary Examiner* — Zhimei Zhu
(74) *Attorney, Agent, or Firm* — McAndrews, Held & Malloy, Ltd.

(57) ABSTRACT

A computer-implemented system and method for automated secure device registration and provisioning of one or more devices enabled for connectivity over cellular network are disclosed. The computer-implemented method for automated secure device registration and provisioning of one or more devices enabled for connectivity over cellular network includes receiving subscriber identity module (SIM) information for at least one SIM; enabling the SIM for restricted connectivity; authenticating the one or more devices using a pre-shared key for each of the one or more devices; obtaining device information from the device; associating at least one of the one or more devices with the at least one SIM; provisioning the authenticated one or more devices; and enabling the one or more devices for general connectivity over cellular network.

15 Claims, 11 Drawing Sheets

(51) Int. Cl.
*H04W 12/069* (2021.01)
*H04W 12/40* (2021.01)
*H04W 12/71* (2021.01)
*H04W 12/72* (2021.01)

(58) Field of Classification Search
CPC ....... H04W 12/08; H04W 12/43; H04W 4/60; H04W 4/70; H04W 4/50; H04L 63/0853; H04L 63/0876
See application file for complete search history.

(56) References Cited

U.S. PATENT DOCUMENTS

| | | | |
|---|---|---|---|
| 10,015,673 B2 | 7/2018 | Silis | |
| 10,298,581 B2 | 5/2019 | Shah | |
| 10,306,578 B2 | 5/2019 | Khan | |
| 10,602,345 B2 | 3/2020 | Chastain | |
| 10,613,499 B2 | 4/2020 | Zimmerman | |
| 10,743,176 B1 | 8/2020 | Khan | |
| 10,785,740 B2 | 9/2020 | Zhang | |
| 10,820,265 B2 * | 10/2020 | Schneider | H04W 12/08 |
| 10,833,926 B2 * | 11/2020 | Ramisetty | H04W 12/35 |
| 11,190,985 B1 * | 11/2021 | Indurkar | H04W 8/04 |
| 11,228,885 B2 * | 1/2022 | Roy | H04W 4/50 |
| 11,617,065 B2 * | 3/2023 | Lankalapalli | H04L 67/141 709/220 |
| 2010/0029247 A1 * | 2/2010 | De Atley | H04W 12/06 455/411 |
| 2011/0136482 A1 * | 6/2011 | Kaliner | H04W 8/265 455/418 |
| 2012/0190354 A1 * | 7/2012 | Merrien | H04L 63/083 455/422.1 |
| 2014/0019760 A1 * | 1/2014 | Vergnes | H04W 12/04 713/175 |
| 2019/0158355 A1 * | 5/2019 | Ramisetty | H04L 63/0853 |
| 2020/0322884 A1 * | 10/2020 | Di Girolamo | H04W 12/06 |
| 2020/0404576 A1 * | 12/2020 | Kang | H04W 48/02 |
| 2021/0067931 A1 * | 3/2021 | Lankalapalli | H04L 67/141 |
| 2021/0120387 A1 * | 4/2021 | Roy | H04W 4/50 |
| 2021/0258295 A1 * | 8/2021 | Katayama | H04L 9/3247 |
| 2022/0247577 A1 * | 8/2022 | Tait | H04L 63/0823 |
| 2023/0094540 A1 * | 3/2023 | Katayama | H04L 9/0861 726/7 |

OTHER PUBLICATIONS www.arrow.com., eSIMs and iSIMs secure the next wave of IoT devices, Oct. 6, 2021, 5 pages.

* cited by examiner

SIM With Embedded Secure Element

100

SIM as Secure Element and Connectivity Provider as Primary Provision Interface

Figure 2C

SIM With External Secure Element

300

Connectivity Provider as primary provision interface

700

METHOD AND SYSTEM FOR AUTOMATED SECURE DEVICE REGISTRATION AND PROVISIONING OVER CELLULAR OR WIRELESS NETWORK

CROSS-REFERENCE TO RELATED APPLICATION

Under 35 USC 119(e), this application claims priority to U.S. provisional application No. 63/243,930 filed Sep. 14, 2021, entitled "METHOD AND SYSTEM FOR AUTOMATED SECURE DEVICE REGISTRATION AND PROVISIONING OVER CELLULAR OR WIRELESS NETWORK", which is herein incorporated by reference in its entirety.

FIELD OF THE INVENTION

The present invention relates generally to secure registration and provisioning of Machine to Machine (M2M) or Internet of Things (IoT) devices using cellular or wireless connectivity.

BACKGROUND

Devices, whether phones, radios or other types of hardware, known as Machine to Machine (M2M) or Internet of Things (IoT) devices, that are intended to connect to networks, such as wireless or cellular networks, are enabled to connect to networks, such as by use with products such as Subscriber Identification Modules (SIMs). As IoT solutions are being deployed in high volume, the need and demand for automated provisioning of device is becoming stronger that works across the phases like manufacturing of the device, shipment of the device and finally deployment in the field. In most cases, device manufacturing companies are neither secure nor connected. Accordingly, what are needed are system and method to address the above identified issues. The present invention addresses such a need.

SUMMARY

A computer-implemented system, method and computer program product for automated secure device registration and provisioning of one or more devices enabled for connectivity over cellular or wireless network are disclosed. The computer-implemented method for automated secure device registration and provisioning of one or more devices enabled for connectivity over cellular or wireless network includes receiving subscriber identity module (SIM) information for at least one SIM; enabling the SIM for restricted connectivity; authenticating the one or more devices using a pre-shared key for each of the one or more devices; obtaining device information from the device; associating at least one of the one or more devices with the at least one SIM; provisioning the authenticated one or more devices; and enabling the one or more devices for general connectivity over cellular network.

The system for automated secure device registration and provisioning over cellular or wireless network comprises one or more devices enabled for connectivity, subscriber identity module (SIM) and a device registration service, wherein the device registration service receives subscriber identity module (SIM) information for at least one SIM; enables the SIM for restricted connectivity; authenticates the one or more devices using a pre-shared key for each of the one or more devices; obtains device information from the device; associates at least one of the one or more devices with the at least one SIM; provisions the authenticated one or more devices; and enables the one or more devices for general connectivity over cellular network.

In an embodiment, the computer program product for automated secure device registration and provisioning of one or more devices enabled for connectivity over cellular or wireless network, having computer readable instructions for causing a computer to control an execution of an application for device registration and provisioning of one or more devices enabled for connectivity including receiving subscriber identity module (SIM) information for at least one SIM; enabling the SIM for restricted connectivity; authenticating the one or more devices using a pre-shared key for each of the one or more devices; obtaining device information from the device; associating at least one of the one or more devices with the at least one SIM; provisioning the authenticated one or more devices; and enabling the one or more devices for general connectivity over cellular network.

BRIEF DESCRIPTION OF THE DRAWINGS

FIGS. 2A-2C illustrate an exemplary system and process for automated secure device registration and provisioning of one or more devices enabled for connectivity over cellular or wireless network in accordance with an embodiment of the present invention.

DETAILED DESCRIPTION

Figure 1:
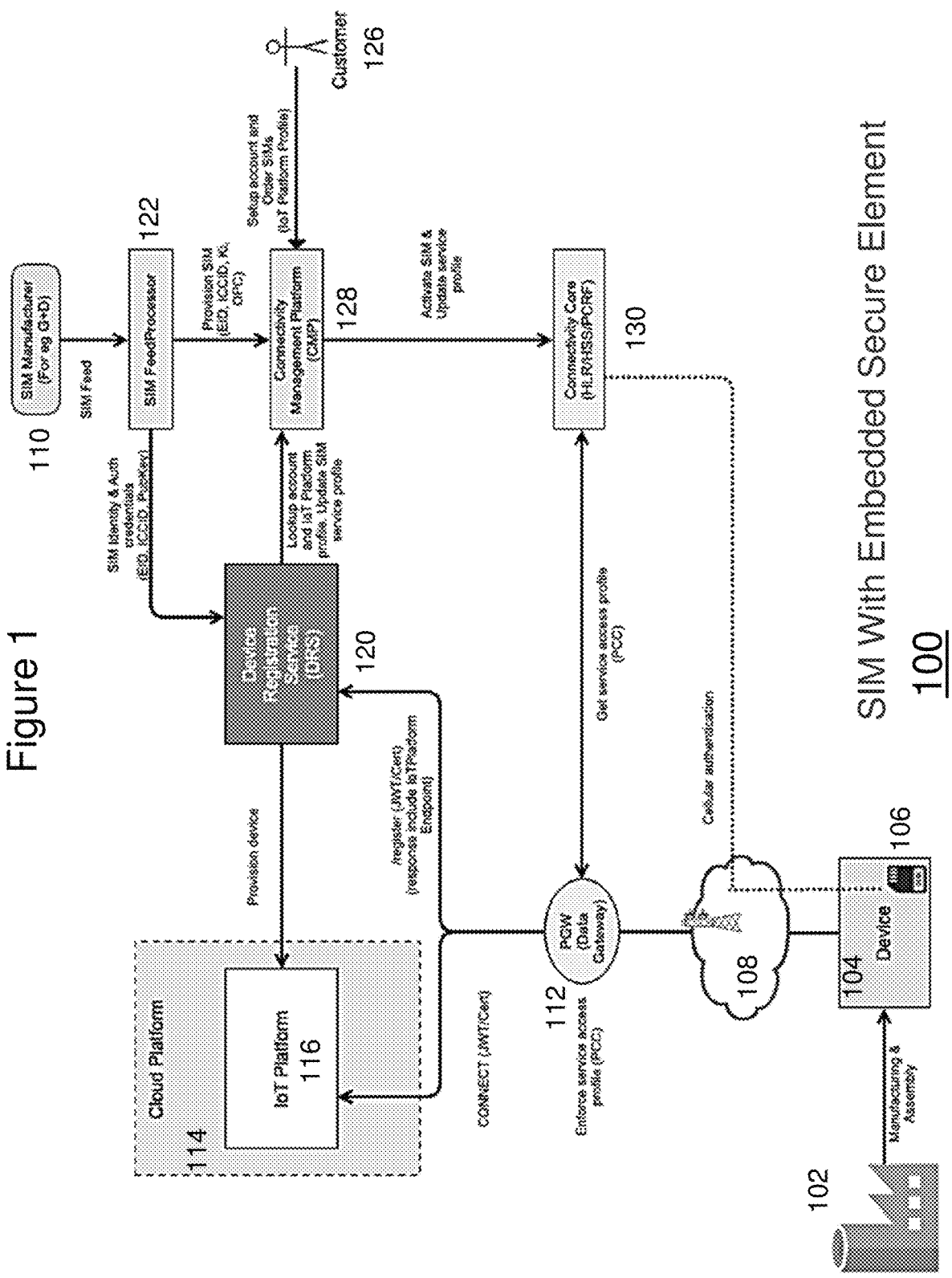
FIG. 1 illustrates an exemplary system 100 and process used for automated secure device registration and provisioning of one or more devices enabled for connectivity over cellular or wireless network in accordance with one or more embodiments of the present invention.

The present invention relates generally to cloud provisioning of Machine to Machine (M2M) or Internet of Things (IoT) devices using cellular or wireless connectivity.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to product such as a Subscriber Identification Module (SIM), as used herein the term "product" is intended to be inclusive, interchangeable, and/or synonymous with appliances, electronic modules, telephony equipment and other similar products that require registration of distinct identifying numbers, such as Integrated Circuit Card Identification Numbers (ICCIDs), international mobile subscriber identity (IMSI)s, mobile equipment identifier (MEID)s or other serial numbers as described further below and collectively referred to herein as "numbers", for that product with a service provider to receive services, though one will recognize that functionally different types of products may have characteristics, functions and/or operations which may be specific to their individual capabilities and/or deployment.

Devices, whether phones, radios or other types of hardware, known as M2M or Internet of Things (IoT) devices, that are intended to connect to networks, such as wireless or cellular networks, are enabled to connect to networks, such as by use with products such as Subscriber Identification Modules (SIMs). As IoT solutions are being deployed in high volume, the need and demand for automated provisioning of device is becoming stronger that works across the phases like manufacturing of the device, shipment of the device and finally deployment in the field.

In most cases, device manufacturing companies are neither secure nor connected. IoT or M2M device supply chain is often very complex with multiple stakeholders including multiple parts suppliers, manufacturing facility, sub-assembly manufacturing (such as telematic control unit (TCU) going into final vehicle manufacturing), original equipment maker (OEM), transport providers (in to and out of manufacturing facility), distributors/dealers, first owner and subsequent owners, users which are often different than owners etc.

Further, the connectivity for the IoT device is mostly introduced late in the stage and adds additional friction to the IoT solution launch. Connecting device over cellular or wireless network requires working with MNO (Mobile Network Operator) or MVNO (Mobile Virtual Network Operator) to obtain the SIMs; provisioning SIMs; pairing of SIMs to devices; provisioning of the devices in the IoT platform and configuring device with IoT platform endpoint. There is every chance of error in the pairing stages, which is not easy to troubleshoot for large programs. While these can be addressed via building some custom automation solutions, but such solutions are expensive to build, maintain and operate. Additionally, the device/s need to be secured in the supply chain from misuse and misconfiguration. This is challenging especially in the case of global programs and complex supply chain.

For the purposes of this document, the term "provisioning" is used to primarily to mean the valid "Registration" of the IoT device or the Thing onto the IoT service or IoT platform for subsequent exchange of data, which takes place after initial network provisioning, network attachment as well as authentication of the IoT devices. In some embodiments, it may also include initial "configuration" of the IoT or M2M devices.

Different approaches may be used to overcome the issues described above. For example, an integrated connectivity and IoT platform provisioning service that is simple, secure, scalable and cost effective may be implemented. The solution involves a Secure Element (SE) that can securely hold crypto keys and perform cryptography operations like sign, verify, encrypt, decrypt etc. The SE can optionally be a Tamper Proof Module (TPM) that is programmed at the manufacturing and cannot be read or changed in an unauthorized way. The SE may be embedded in the SIM, which makes the complete system more secure and reduces the cost and also reduce the manufacturing and operation complexity. In certain IoT solutions, the SE could be optional. This would primarily be driven by cost vs security trade-offs. Customers can select an IoT platform of their choice and setup account with connectivity provider for secure hands-free provisioning by providing the IoT Platform endpoint details. The solution can have out of the box support for well-known public cloud IoT platforms. A registration service with access to connectivity core orchestrates the authentication and provisioning workflow without any manual intervention.

An exemplary approach includes using authentication devices, e.g., Microchip Technology ATECC508A Crypto Authentication Device along with the SIM. These have to be installed in the device at the time of manufacturing, where the authentication keys are included in the authentication device itself. The authentication device securely maintains security keys. The authentication devices thus installed may be securely provisioned by the manufacturer of such authentication devices, eliminating loss of security keys. Signer as well as user certificates are maintained securely inside the authentication device. Industry standard cryptographic processes may be hardware accelerated in the authentication devices ensuring a quick and secure connection.

To describe the features of the present invention in more detail within the context of IoT devices with products such as SIMs installed in them, for example, vehicles or sensors, refer to the accompanying figures in conjunction with the following discussions. These examples are used for purpose of illustration only, and should not be construed as limitations.

The embodiments described herein disclose a computer implemented method and system for automated secure device registration and provisioning of one or more devices enabled for connectivity over cellular or wireless network.

A computer-implemented system, method and computer program product for automated secure device registration and provisioning of one or more devices enabled for connectivity over cellular or wireless network are disclosed. The computer-implemented method for automated secure device registration and provisioning of one or more devices enabled for connectivity over cellular or wireless network includes receiving subscriber identity module (SIM) information for at least one SIM; enabling the SIM for restricted connectivity; authenticating the one or more devices using a pre-shared key for each of the one or more devices; obtaining device information from the device; associating at least one of the one or more devices with the at least one SIM; provisioning the authenticated one or more devices; and enabling the one or more devices for general connectivity over cellular network.

The system for automated secure device registration and provisioning over cellular or wireless network comprises one or more devices enabled for connectivity, subscriber identity module (SIM) and a device registration service, wherein the device registration service receives subscriber identity module (SIM) information for at least one SIM; enables the SIM for restricted connectivity; authenticates the one or more devices using a pre-shared key for each of the one or more devices; obtains device information from the device; associates at least one of the one or more devices with the at least one SIM; provisions the authenticated one or more devices; and enables the one or more devices for general connectivity over cellular network.

In an embodiment, the computer program product for automated secure device registration and provisioning of one or more devices enabled for connectivity over cellular or wireless network, having computer readable instructions for causing a computer to control an execution of an application for device registration and provisioning of one or more devices enabled for connectivity including receiving subscriber identity module (SIM) information for at least one SIM; enabling the SIM for restricted connectivity; authenticating the one or more devices using a pre-shared key for each of the one or more devices; obtaining device information from the device; associating at least one of the one or more devices with the at least one SIM; provisioning the authenticated one or more devices; and enabling the one or more devices for general connectivity over cellular network.

FIG. 1 illustrates an exemplary system 100 used for automated secure device registration and provisioning of one or more devices enabled for connectivity over cellular or wireless network in accordance with one or more embodiments of the present invention. The system for automated secure device registration and provisioning over cellular or wireless network comprises one or more devices enabled for connectivity 104, subscriber identity module (SIM) 106, where the secure element (SE) may be embedded in the SIM, and a device registration service (DRS) 120, also known as orchestrator platform which includes a database and a processor. The device registration service (DRS) 120 receives subscriber identity module (SIM) information for at least one SIM 106 from SIM feed processor 122; authenticates device based on the pre-shared symmetric or asymmetric key in the SIM; uses the device information from the authentication request; associates the device 104 with the SIM 106; provisions devices 104 based on the device information from the authentication request into the IoT Platform 116; and enables access/communication to the IoT Platform from the device.

Device Registration Service (DRS) 120 is responsible for authentication and orchestration of pairing and provisioning workflow. The DRS 120 can be separate as illustrated or part of other components such as connectivity platform (CMP) 128 or Connectivity Core 130. In certain use cases, it could even be deployed close to IoT Platform 116.

SIM Feed Processor 122 processes feeds received from SIM manufacturer (e.g. G+D(GiDe), Gemalto, etc.) The feed from SIM manufacturer included the secret keys embedded in the SIM. These are typically symmetric key Ki and may include one or more other symmetric keys or public keys of the asymmetric keys (RSA or ECC keys). The SIM Feed Processor 122 loads SIM identifier into Connectivity Management Platform (CMP) 128, which stores it in platform specific inventory database. The SIM 106 could be a physical SIM or an embedded SIM (eSIM).

Connectivity Management Platform (CMP) 128 manages SIMs 106 and devices 104. Customers 126 use CMP services to order SIMs, which results in assignment and provisioning of SIMs to customer's account. The CMP 128 may be composed of multiple microservices like account management, device management, inventory management etc. with one or more databases to store the information securely, for carrying out the functions such as assignment and provisioning of SIMs to customer's account.

Connectivity Core 130 includes all the core service to manage the cellular network connectivity. The actual services may vary by the technology used for implementation. For example, for 3G: Home Location Register (HLR) and Policy and Charging Rules Function (PCRF), for 4G: Home Subscriber Server (HSS) and PCRF, for 5G: The User Plane Function (UPF) and Policy Control function (PCF) plus Session Management Function (SMF) etc. The Packet Gateway (PGW) 112 uses the Policy and Charging Control (PCC) rules from PCRF/PCF of Connectivity Core 130 to control device's 104 access to the internet and eventually to services like IoT Platform 116 that hosts the services that the application on device 104 connects to.

The SIM manufacturer 110 manufactures the SIMs and send the SIM information such as Integrated Circuit Card Identifier (ICCID) or International mobile subscriber identity (IMSI) in a SIM feed to SIM Feed Processor 122 in a secure way. The feed includes SIM details like identifiers (endpoint identifier (EID), ICCID) and secret keys (Ki, OPC) and one or more symmetric keys or public keys of the asymmetric keys (RSA, ECC) that are accessible to the application on the device. The SIM Feed Processor 122 sends SIM details (EID, ICCID), symmetric keys, and public key to DRS 120. The SIM Feed Processor 122 also sends the SIM details and secret keys (Ki, OPC) to CMP 128 where it is stored securely.

Customer 126 creates an account with connectivity management platform (CMP) 128, selects the IoT Platform profile and provides details for the selected IoT Platform profile. An IoT Platform profile includes details like IoT platform endpoint and attributes specific to IoT platform that are used to connect to IoT Platform and provision devices later in the workflow. The CMP and DRS include a set of well-known IoT Platform profiles for example, public cloud IoT platforms. The customers provide their account specific attributes for the IoT Platform profile. Such attributes may include accountId, projectId, regionId, registryId etc. The customer then orders SIMs as SIM Order. CMP 128 then allocate SIMs to customer account and activate them by provisioning into Connectivity Core 130 with service profile (which contain PCC rules) that allows access to only DRS 120.

The Connectivity Core 130 internally uses services like HSS, PCRF and policy and charging enforcement function (PCEF) to implement the service profile.

The Packet Gateway (PGW) 112 is the gateway to the internet for IoT devices. All data communication from a device 104 to services in the cloud go via PGW 112. This could also be a 3G GGSN or 5G UPF. The Packet Gateway (PGW) 122 uses the PCC rules from PCRF/PCF of Connectivity Core 130 to control device's 104 access to the internet and eventually to services like IoT Platform 116 that hosts the services that the application on device 104 connect to.

Device 104 is connected to PGW 112 via cellular or other wireless communication means 108 such as cell tower by performing cellular (SIM) authentication using protocol like Authentication and Key Agreement (AKA) protocol or Extensible Authentication Protocol-AKA (EAP-AKA) and starting a new data session. The initial set of provisioned PCC rules for the SIM allow connectivity to only DRS 120.

The device registration service (DRS) 120 or orchestrator platform works in concert with a client on the device 104 which provides JSON Web Token (JWT) which is used to authenticate the client (application) on the device 104. If the authentication is successful, the device 104 is provisioned in the cloud IoT platform 116 and service profile is updated with new PCC rules in the Connectivity Core 130 to allow access to the IoT Platform 116. This authentication and provisioning are further illustrated in FIGS. 2A-2C and described in the description accompanying FIGS. 2A-2C.

Figure 2A:
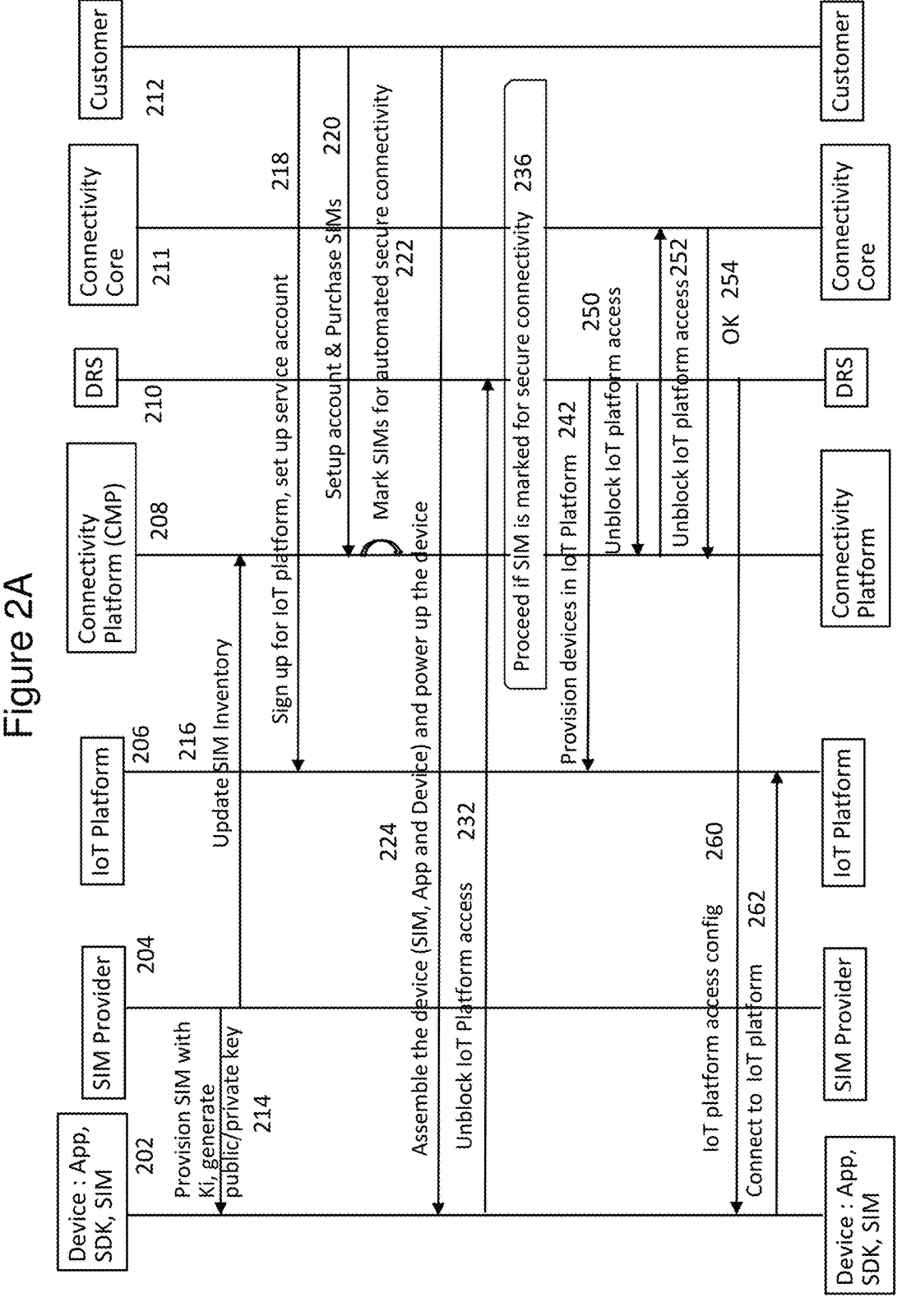
Figure 2B:
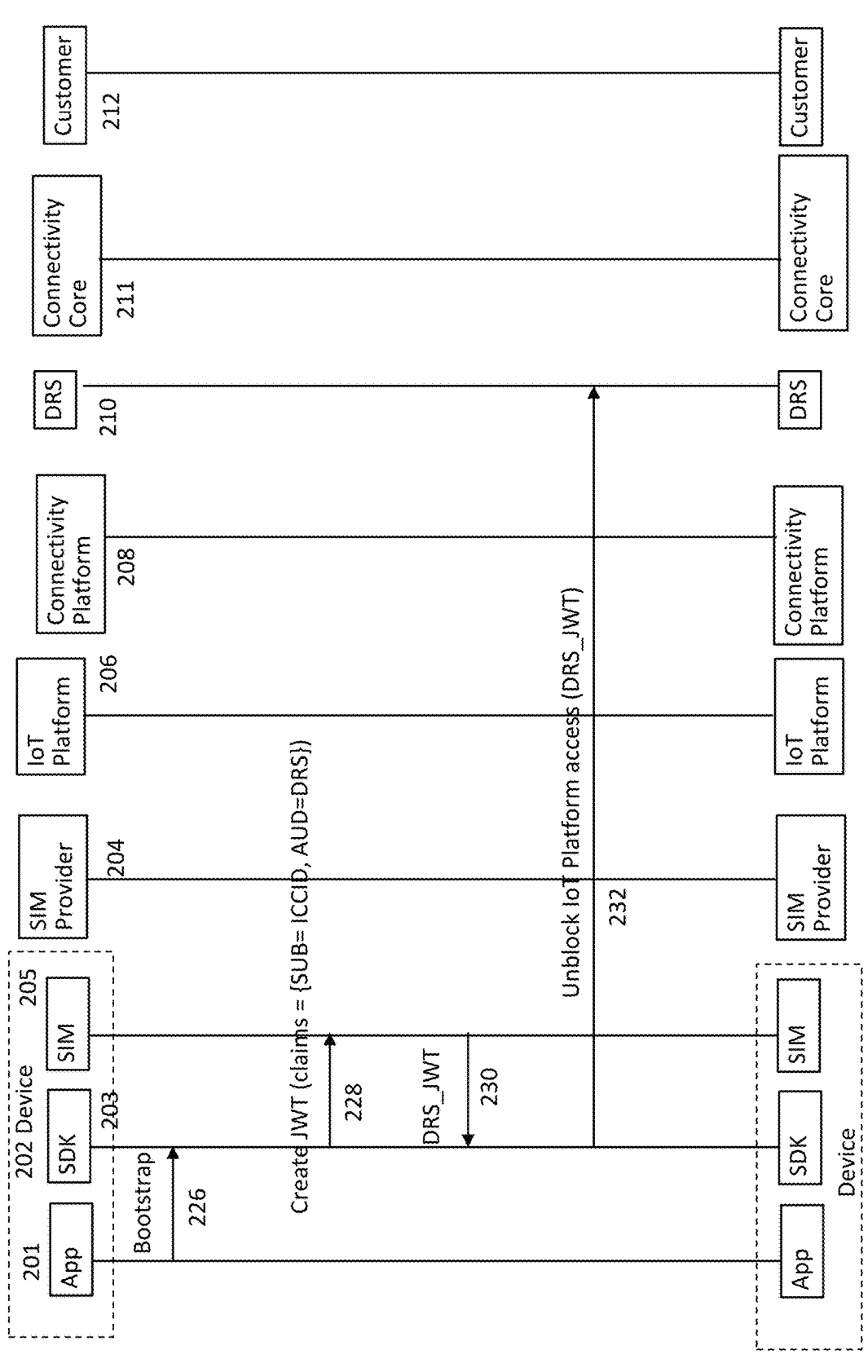
Figure 2C:
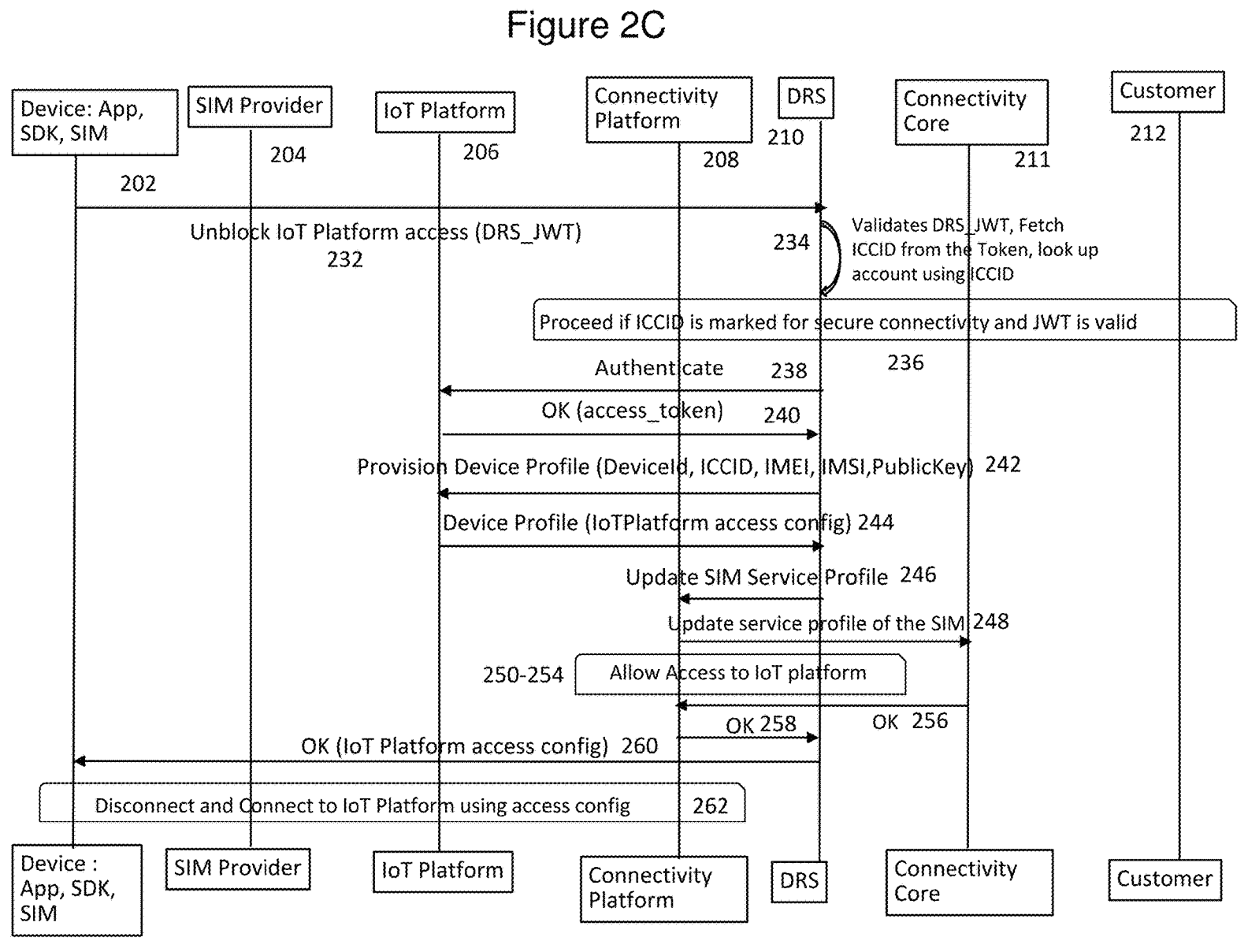

The JWT authentication may be used initially when registering for the first time i.e. when IoT Cloud connection details are not available. It may also be used if connection to IoT platform 116 fails, which may happen if the device 104 was de-registered from IoT platform 116 or underwent a factory reset for some reason. Upon successful registration, the device identifier (ID) is returned by the orchestration platform or DRS 120 for use in subsequent communication with additional information including any one or more of: Endpoint URI in the form <protocol>://<fqdn>[:<port>], IoT platform parameters that may vary by platform. For example, projectId or accountId the device is provisioned in, regionId in which the device is provisioned in, registryId in which the device is provisioned in etc. This authentication and provisioning are illustrated in FIGS. 2A-2C and described in the description accompanying FIGS. 2A-2C.

For example, in an embodiment, a network service provider may setup one Service Account that will be owned by the network service provider. Customer or IoT platform may make an endpoint available with permission to the service account to provision the devices in the customer's project/account in the IoT platform. This allows customer and IoT platform to be in control of the access and security. The actual mechanism of integration between network service provider and IoT Platform varies by platform.

Figure 3:
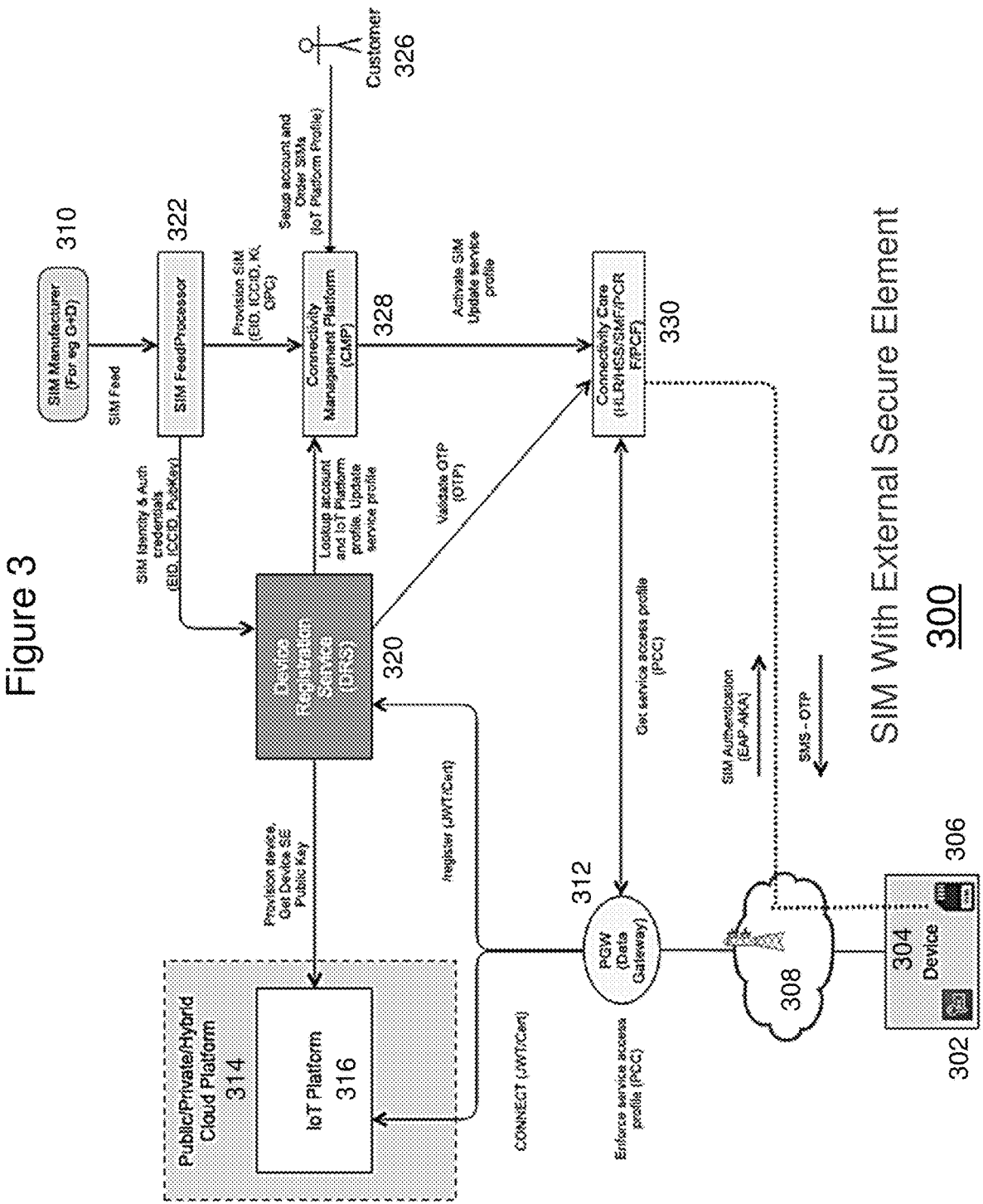
FIG. 3 illustrates an exemplary system and process for automated secure device registration and provisioning of one or more devices enabled for connectivity over cellular or wireless network in accordance with an embodiment of the present invention.

In an embodiment, the system architecture may be enhanced to incorporate the device which has regular SIM, for example, a SIM without embedded secure element (eSE) and a separate Microchip as Secure Element (SE) as illustrated by FIG. 3.

Figure 4A:
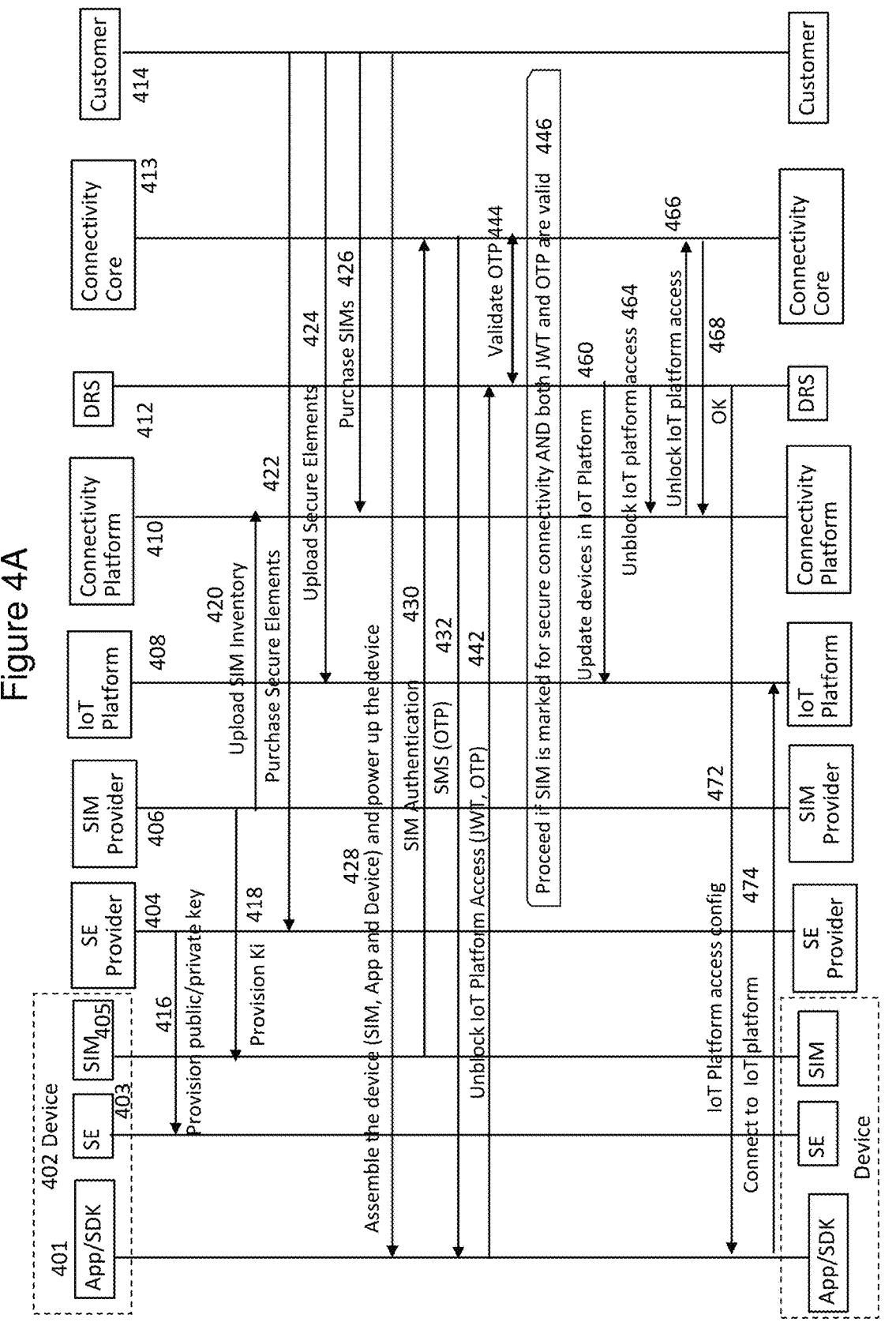
FIGS. 4A-4C illustrate an exemplary system and process for automated secure device registration and provisioning of one or more devices enabled for connectivity over cellular or wireless network in accordance with an embodiment of the present invention.
Figure 4B:
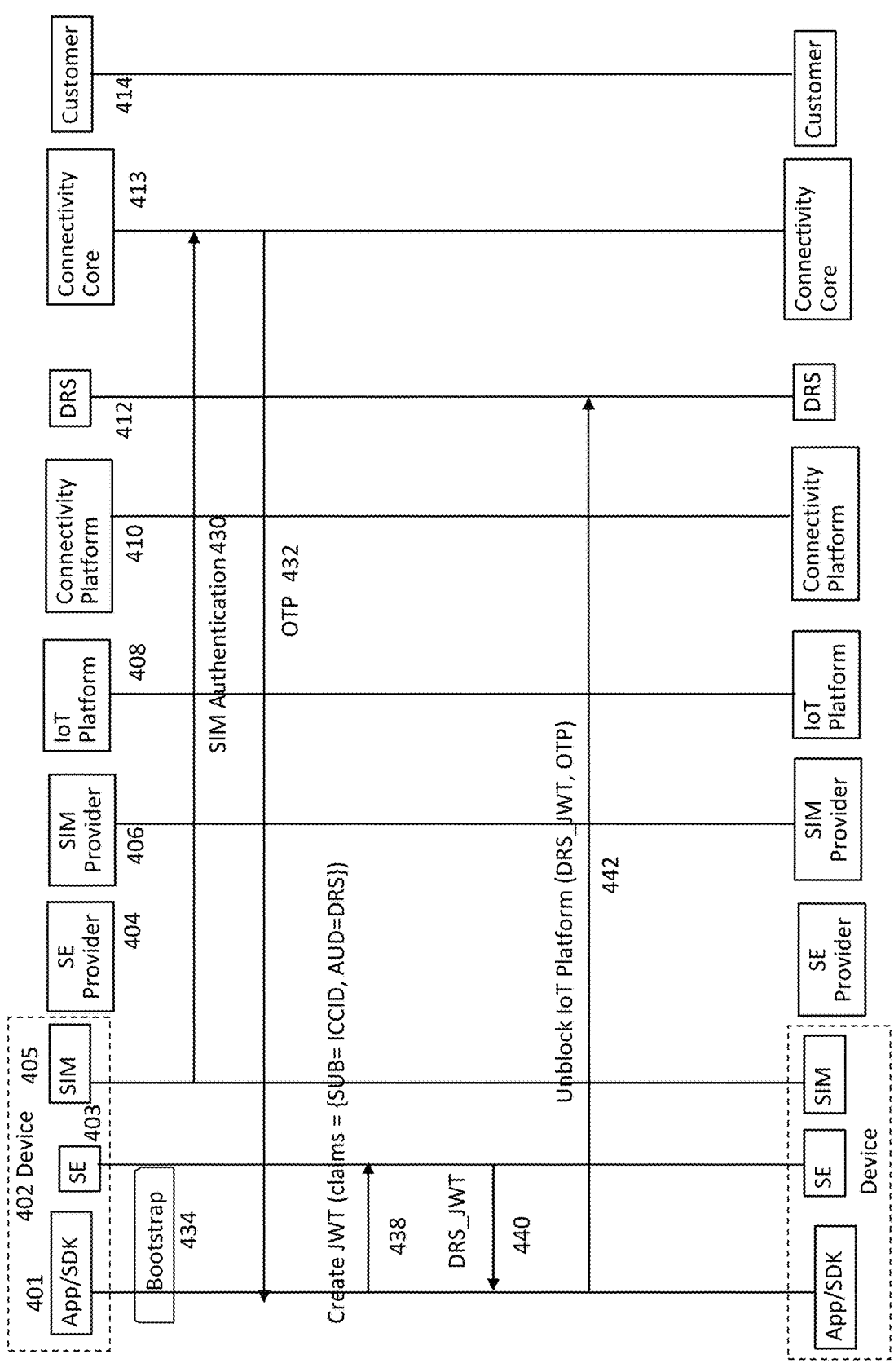
Figure 4C:
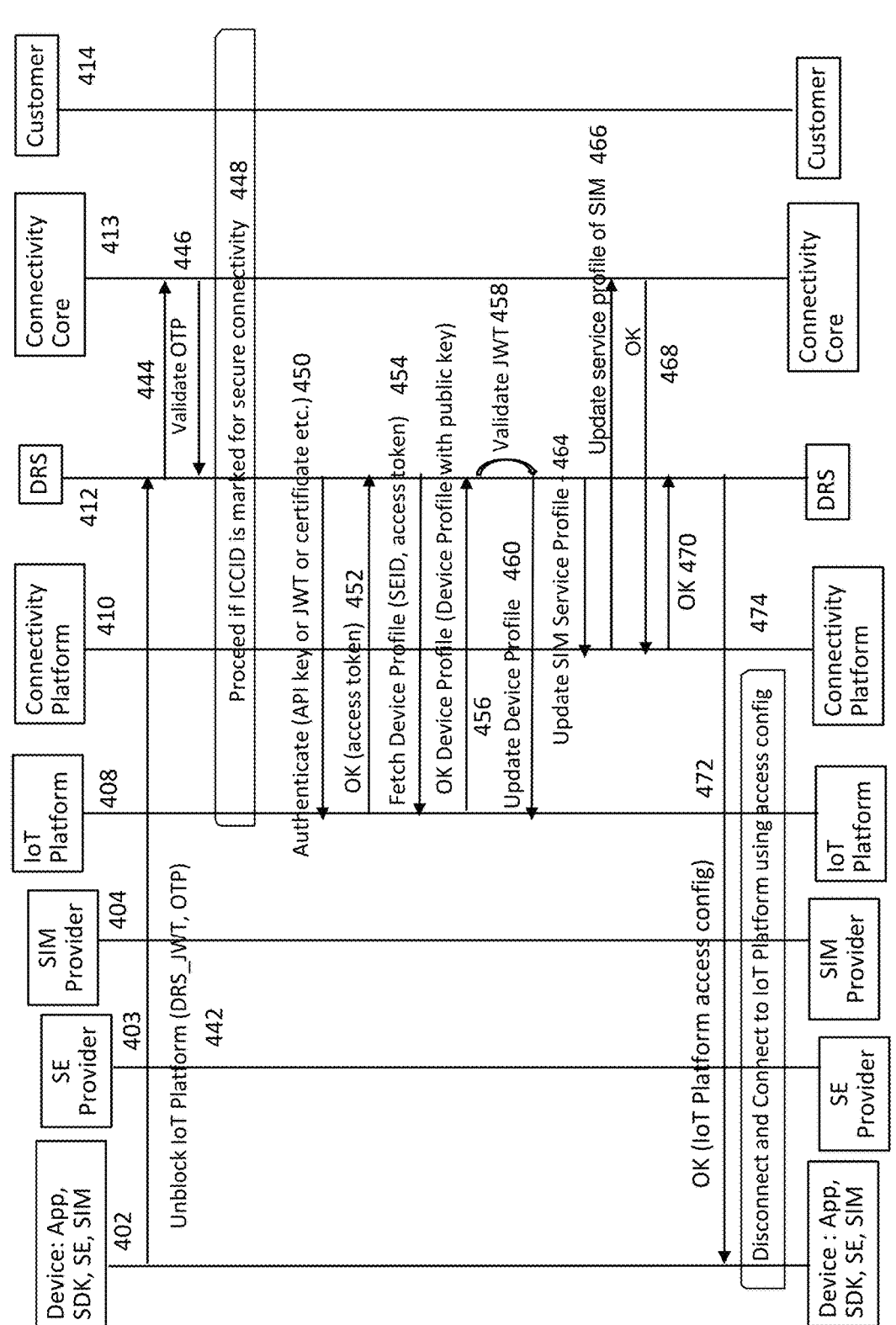
Figure 5:
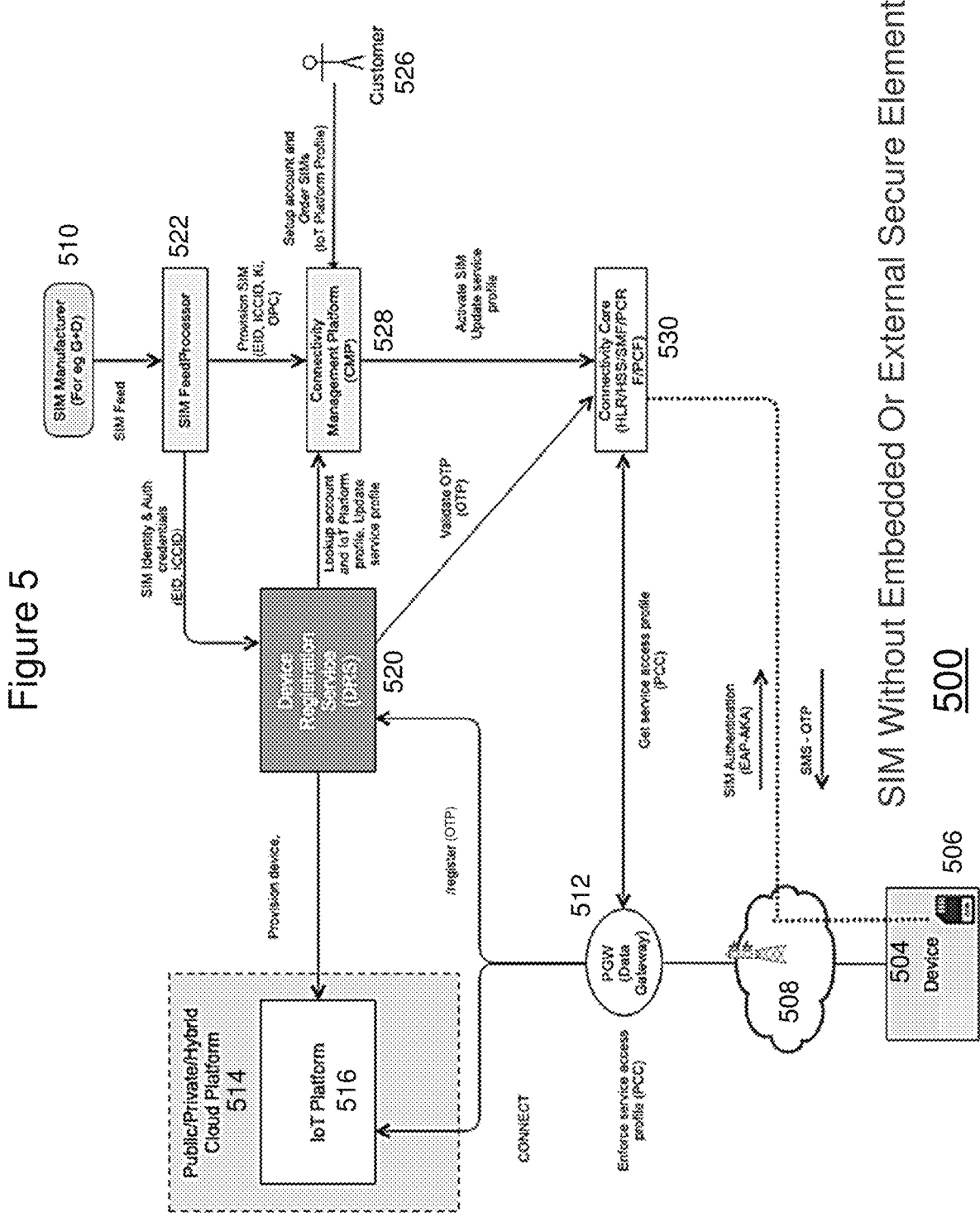
FIG. 5 illustrates an exemplary system and process for automated secure device registration and provisioning of one or more devices enabled for connectivity over cellular or wireless network in accordance with an embodiment of the present invention.
Figure 6:
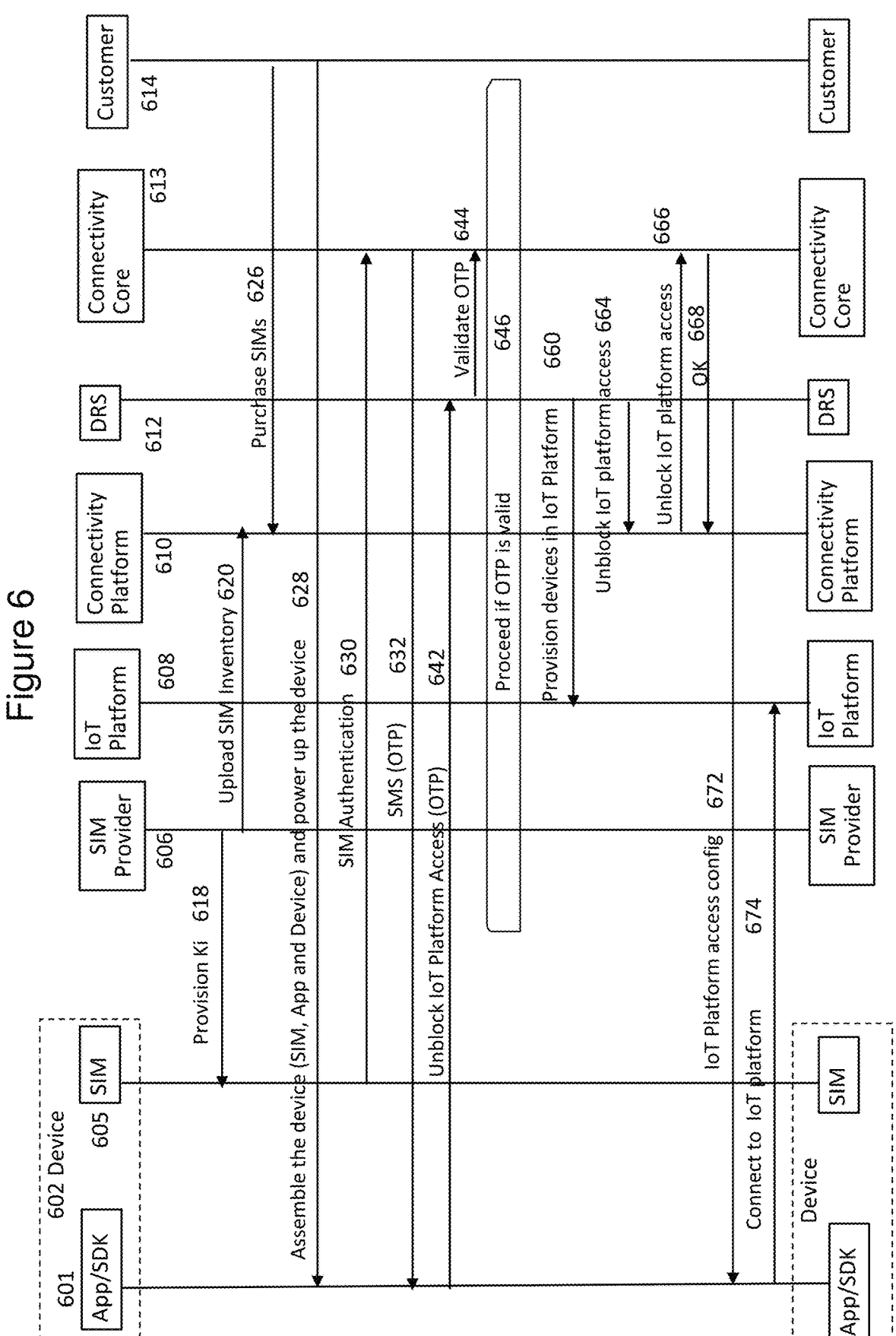
FIG. 6 illustrates an exemplary system and process for automated secure device registration and provisioning of one or more devices enabled for connectivity over cellular or wireless network in accordance with an embodiment of the present invention.

Although embodiments with a SIM including embedded secure element (eSE) as illustrated by FIGS. 1, 2A, 2B and 2C, and a SIM without embedded secure element (eSE) and a separate Microchip as Secure Element (SE) as illustrated by FIGS. 3, 4A, 4B and 4C are described herein, a person skilled in the art may readily recognize that the present invention can also be practiced using a SIM without embedded and/or external secure element and hence is within the scope of this invention as illustrated in FIGS. 5 and 6.

FIG. 2A illustrates an exemplary process for automated secure device registration and provisioning of one or more devices enabled for connectivity over cellular or wireless network in accordance with an embodiment of the present invention. In an embodiment, the system for automated secure device registration and provisioning of one or more devices enabled for connectivity over cellular or wireless network includes a device 202, SIM provider 204, IoT Platform 206, connectivity platform 208, device registration service (DRS) 210. The system used herein is illustrated in FIG. 1 and described in detail in the description accompanying FIG. 1.

In an embodiment, the process for automated secure device registration and provisioning of one or more devices enabled for connectivity over cellular or wireless network is described as follows. The SIM provider 204 manufactures SIMs with secure element (SE) profile, provisions the SIM with Ki and provision additional symmetric and asymmetric (public key/private) keys via step 214. The SIM provider 204 shares the feed containing SIM information of one or more SIMs with network provider, which is eventually loaded into the SIM inventory of CMP 208 via step 216. The IoT platform 206 may further include IoT provisioning service, IoT core and a cloud platform and the device 202 may include an application SDK and a SIM with embedded secure element (eSE).

A customer 212, for example, original equipment manufacturer (OEM) or a fleet management solution provider signs up for IoT platform 206 and sets up service account via step 218. The customer 212 may also setup an account in network service providers CMP 208 and purchases/orders SIMs from the CMP 208 via step 220. The customer 212 selects the IoT Platform profile while setting up the account and provide requested information related to the IoT Platform profile that include details like accountId/projectId, regionId, registryId etc. Apart from number of SIM, the customer 212 provides other details like form factor and services needed in the SIM order. The Connectivity Management Platform (CMP) 208 assigns an orderID and assigns the ordered number of SIMs to the customer 212 based on order details such as number of SIMs, service profile selection etc. The SIMs assigned to a specific customer are marked for automated secure device registration and provisioning of one or more devices enabled for connectivity over cellular or wireless network for that customer via step 222. These SIMs are then activated to work with the default service profile, e.g., profile 1 that allows access to only DRS 210 based on the PCC rules configured in the service profile. The purchased SIMs may then be shipped to the customer 212 to be installed in the device/s 202.

Each of the one or more devices 202 are assembled to include SIM, application and device, and powered up via step 224 and authenticated via cellular authentication to allow data connection. Thus, in an embodiment, the device 202 may include an application, SDK and a SIM with embedded Secure Element (eSIM).

Once the cellular authentication is complete, and data connection is established, the application on the device uses SIM with embedded SE to generate a JWT via step 228. The service profile (with PCC rules) in effect in Connectivity Core 211 allows access to only DRS 210 via step 232. The application requests DRS 210 to unblock access to IoT platform 206 illustrated by step 232, is illustrated in further detail in FIG. 2B.

If the SIM (and/or the ICCID) is marked for secure connectivity 236, the DRS 210, after validating the JWT via step 226, provisions the device in IoT platform via step 242 and sends unblock IoT platform access request to connectivity platform also known as connectivity management platform (CMP) 208 via step 250. The CMP 208 sends request to Connectivity Core 211 to unblock access to IoT platform via step 252 by updating the service profile (with PCC rules) of SIM. If successful via step 254, the DRS 210 sends successful response back to application along with IoT platform access configuration, wherein the access configuration may include any one or more of: endpoint (domain name/IP address and port), authentication parameters, etc. via step 260, which allows the device 202 to connect to IoT platform 206 in cloud services via step 262. This connection to IoT platform 206 via steps 232-262 is illustrated in FIG. 2C.

FIG. 2B illustrates unblocking of IoT platform, step 232, illustrated in FIG. 2A may include triggering a bootstrap sequence 226 in the application 201 that may be implemented by the Software Development Kit (SDK) 203. The SDK 203 uses the SIM 205 with embedded SE to generate a signed JWT (claims={SUB=ICCID, AUD=DRS}) referred as DRS_JWT via step 228. The JWT can be signed using symmetric key or asymmetric key pair like RSA/ECC keys and may contain additional claims containing device information like serial number, software version, device identifier, make and model of the device and international mobile equipment identity (IMEI) etc. The SIM 205 then returns DRS_JWT to SDK 203 via step 230, which is then included in request to DRS to unblock IoT platform access via step 232. DRS 210 does so by validating the JWT signature using symmetric or asymmetric key by fetching corresponding key from CMP 208 by ICCID from the token and performing account look up using ICCID via step 234 as shown in FIG. 2C.

FIG. 2C illustrates continuation of the workflow to establish connection to IoT platform, steps 232-262. The application sends request to DRS to unblock IoT platform access via step 232. The DRS 210 validates JWT by fetching ICCID from the token and looking up account using the fetched ICCID, and if the ICCID is marked for secure connectivity via step 236. If the ICCID is marked for secure connectivity and JWT is valid, the DRS 210 proceeds with provisioning the device 202 in IoT Platform 206 via step 242. This involves authenticating to the IoT Platform (steps 238 and 240) and then invoking API to provision device profile in IoT Platform 206. The parameters to provision vary by IoT Platform. The IoT platform 206 responds with IoT Platform access configuration that is to be passed subsequently to the device to connect to IoT Platform service via step 244. The DRS 210 then updates the service profile of the SIM in CMP 208 via step 246 to say profile2 that has the PCC rules to allow device 202 to connect to IoT Platform 206. CMP 208 in turn applies the service profile (PCC rules) changes to the SIM in Connectivity Core 211 via step 248. This allows access to IoT platform 206 as illustrated by steps 250-254 in FIG. 2A. Finally, the DRS 210 sends IoT platform 206 access configuration to the device 202 via step 260, which disconnects and connects to the IoT platform 206 using access configuration via step 262.

FIG. 3 illustrates an exemplary system 300 for automated secure device registration and provisioning of one or more devices enabled for connectivity over cellular or wireless network in accordance with an embodiment of the present invention. FIG. 3 illustrates an example system and process for automated secure device registration and provisioning of one or more devices enabled for connectivity where the device is assembled using a SIM and external secure element (SE). The system for automated secure device registration and provisioning of one or more devices enabled for connectivity where the device is assembled using a SIM and external secure element (SE) includes a device 304 further including an application, a TPM or SE 302 and a SIM 306; a device registration service (DRS) 320, also known as orchestrator platform which includes a database and a processor; Connectivity management platform 328; connectivity core 330 and IoT platform 316.

The device registration service (DRS) 320 receives subscriber identity module (SIM) information for at least one SIM 306 from SIM feed processor 322; authenticates device based on the pre-shared symmetric or asymmetric key in the SIM 306; uses the device information from the authentication request; associates the device 304 with the SIM 306; provisions devices 304 based on the device information like serial number, software version, device identifier, make and model of the device and international mobile equipment identity (IMEI) etc. from the authentication request into the IoT Platform 314; and enables access/communication to the IoT Platform 314 from the device 304.

Device Registration Service (DRS) 320 is responsible for authentication and orchestration of pairing and provisioning workflow. The DRS 320 can be separate as illustrated or part of other components such as connectivity platform (CMP) 328 or Connectivity Core 330. In certain use cases, it could even be deployed close to IoT Platform 316.

SIM Feed Processor 322 processes feeds received from SIM Manufacturer (e.g. G+D (GiDe), Gemalto, etc.). The feed from SIM manufacturer included the secret keys embedded in the SIM. These are typically symmetric key Ki and may include one or more other symmetric keys or public keys of the asymmetric keys (RSA or ECC keys). The SIM Feed Processor loads SIM identifier into Connectivity Management Platform (CMP) 328, which stores it in platform specific inventory database. In an embodiment, the SIM 106 could be a physical SIM or an embedded SIM (eSIM) with a separate secure element (SE) 302.

Connectivity Management Platform (CMP) 328 manages SIMs 306 and Device(s) 304. Customers 326 use CMP services to order SIMs, which results in assignment and provisioning of SIMs to customer's account. The CMP 328 may be composed of multiple microservices like account management, device management, inventory management etc. with one or more databases to store the information securely, for carrying out the functions such as assignment and provisioning of SIMs to customer's account.

Connectivity Core 330 includes all the core service to manage the cellular network connectivity. The actual services may vary by the technology used for implementation. For example, for 3G: HLR and PCRF, for 4G: HSS and PCRF, for 5G: UPF and PCF+SMF etc. The Packet Gateway, PGW uses the PCC rules from PCRF/PCF of Connectivity Core to control device's access to the internet and eventually to services like IoT Platform 316 that hosts the services that the application on device 304 connects to.

In an embodiment, cellular module that allows connectivity in the device 304 performs SIM authentication with Connectivity Core 330. A service in the connectivity core 330 sends device a one-time password (OTP) via control channel like Short Message Service (SMS) or other means like Non-IP Data Delivery (NIDD) if supported by device and network. Application on the device 304 uses the SE 302 to generate a signed token. The token also includes the device identifiers (e.g., serial number, IMEI, ICCID etc.) and one-time password (OTP). Alternatively, the application can use the certificate to authenticate the device 304 and include the identifiers and OTP in the request payload over Hypertext Transfer Protocol Secure (HTTPS) or other secure protocols. DRS 320 validates the token and OTP and provisions the device 304 in IoT Platform 316. The DRS 320 then invokes one or more Application Programming Interfaces (APIs) towards CMP 328 to update the service profile to allow access to IoT Platform 316. The device 304 then establishes connections to IoT Platform 316.

This process implemented using the system shown in FIG. 3 is illustrated in detail in FIG. 4A-C and described in detail in the description accompanying FIGS. 4A-C.

FIGS. 4A-C illustrate exemplary system and process for automated secure device registration and provisioning of one or more devices enabled for connectivity over cellular or wireless network in accordance with an embodiment of the present invention.

FIG. 4A illustrates an exemplary system and process for automated secure device registration and provisioning of one or more devices enabled for connectivity over cellular or wireless network in accordance with an embodiment of the present invention. In an embodiment, the system for automated secure device registration and provisioning of one or more devices enabled for connectivity over cellular or wireless network includes a device 402, SIM provider 404, IoT Platform 408, connectivity platform 410, device registration service (DRS) 412. The secure element (SE) manufacturer manufactures SE with Public/Private key pair in the SE. The SIM provider manufactures SIM with symmetric key Ki in the SIM. The SIM provider 406 shares the feed containing SIM information such as Integrated Circuit Card Identifier (ICCID) or International mobile subscriber identity (IMSI), Ki and other attributes of one or more SIMs with network provider, which is eventually loaded into the SIM inventory of CMP 410 via step 420.

The IoT Platform 408 may further include IoT provisioning service, IoT Gateway and the device 402 may include an application/SDK 401, secure element (SE) 403 and a SIM 405. The application/SDK function 401 can be extracted into SDK for use in multiple use cases.

The system used to implement the process described herein is illustrated in FIG. 3 and described in detail in the description accompanying FIG. 3.

In an embodiment, the process for automated secure device registration and provisioning of one or more devices enabled for connectivity over cellular or wireless network is described as follows. A customer 414, for example, original equipment manufacturer (OEM), signs up for IoT Platform 408, set up service account with IoT Platform 408 and purchases/orders SEs from SE provider 404 via step 422 and uploads SEs in IoT Platform 408 via step 424. The customer 414 also purchases SIMs from the Connectivity Platform CMP 410. The customer 414 may choose number of SIMs to be ordered and service profile. The service profile describes the services like SMS, data, voice, roaming etc. that should be enables for the SIM. The CMP 410 assigns an orderID and assigns the ordered number of SIMs to the customer 414 based on order details such as number of SIMs, service profile selection etc.

Similar to the steps described in FIG. 2A, the SIMs assigned to a specific customer are marked for automated secure device registration and provisioning of one or more devices enabled for connectivity over cellular or wireless network for that customer. These SIMs are then activated to work with the default service profile, e.g., profile 1. The purchased SIMs may then be shipped to the customer to be installed in the devices.

The device 402 is assembled to include SIM 405, secure element (SE) 403, application/SDK 401 and device itself, and powered up via step 428. The device 402 is then authenticated via cellular authentication via step 430. After successful cellular authentication the service in connectivity core 413 sends OTP to device via SMS or NIDD via step 432.

For example, in an embodiment, cellular module that allows connectivity in the device 304 performs SIM authentication with Connectivity Core 413. A service in the connectivity core 413 sends device a one-time password (OTP) via control channel like SMS or other means like Non-IP Data Delivery (NIDD) if supported by device and network. Application on the device 402 uses the SE 403 to generate a signed token. The token also includes the device identifiers (e.g., serial number, IMEI, ICCID etc.) and the OTP. Alternatively, the application 401 can use the certificate to authenticate the device 402 and include the identifiers and OTP in the request payload over HTTPS or other secure protocol. DRS 412 validates the token and OTP and provisions the device 402 in IoT Platform 408. The DRS 412 then invokes APIs towards CMP 410 to update the service profile to allow access to IoT Platform 408. The device 402 then establishes connections to IoT Platform 408.

FIG. 4B illustrates the steps for device requesting DRS to unblock access to IoT platform, steps 430 to 442 (also known as Bootstrap, step 434) and FIG. 4C illustrates the steps for DRS orchestrating the workflow of provisioning the device in IoT Platform and unblocking access to the IoT Platform, steps 442 to 474.

FIG. 4B illustrates the details of steps 430 to 442 (also known as Bootstrap, step 434) illustrated in FIG. 4A. Once the cellular authentication is complete, and data connection is established via steps 430 and OTP has been received via step 432, the application on the device 402 uses secure element (SE) 403 to generate a JSON Web Token (JWT) via steps 438 and 440. The service profile (with PCC rules) in effect in Connectivity Core 413 allows access to only DRS 412. The application requests DRS 412 to unblock access to IoT platform 408 illustrated by step 442.

The FIG. 4C illustrates the steps for DRS orchestrating the workflow of provisioning the device in IoT Platform and unblocking access to the IoT Platform. The application sends request to DRS to unblock IoT platform access via step 442. The DRS 412 reaches out to Connectivity Core to validate the OTP. If the OTP is valid and the SIM is marked for secure connectivity and provisioning, the DRS authenticates to IoT Platform via step 450. The DRS can use the available/pre-configured authentication schemes like API Key, JWT or certificate to authenticate to IoT Platform via step 450 and 452. If authentication is successful, DRS invokes API towards IoT Platform to fetch the Device Profile in step 454 and 456, which essentially is just the SE details like access configuration, wherein the access configuration may include any one or more of: endpoint (domain name/IP address and port), authentication parameters, etc., serial number and Public Key corresponding to the private key that was provisioned in SE during manufacturing. DRS then validates the DRS_JWT received in the request from the device using the Public Key obtained from IoT Platform in step 458.

If the DRS_JWT is valid the DRS provision (update) the device profile in IoT Platform via step 460. The update essentially creates association between Device, SE and SIM automatically. The DRS then update the SIM service profile in Connectivity platform via step 464 and 470, to say profile 2 that has the rules to allow access to the IoT Platform. The Connectivity platform in turn applies the updates service profile to the SIM in Connectivity Core via step 466 and 468.

Finally, the DRS 412 sends IoT platform 408 access configuration to the device 402 via step 472, which disconnects and connects to the IoT platform 408 using the access configuration via step 474.

FIG. 5 illustrates an exemplary system 500 for automated secure device registration and provisioning of one or more devices enabled for connectivity over cellular or wireless network in accordance with an embodiment of the present invention. In an example embodiment, the system and process for automated secure device registration and provisioning of one or more devices enabled for connectivity over cellular or wireless network may be achieved using a SIM without embedded and/or external secure element. The system is similar to the system 300 except without the external secure element illustrated as 302 in FIG. 3. In this embodiment, there is a trade-off between security and cost (removing need for external SE or embedded SE). FIG. 6 describes the flow.

FIG. 6 illustrates an exemplary system and process for automated secure device registration and provisioning of one or more devices enabled for connectivity over cellular or wireless network in accordance with an embodiment of the present invention. In an embodiment, the system for automated secure device registration and provisioning of one or more devices enabled for connectivity over cellular or wireless network includes a device 602, SIM provider 606, IoT Platform 608, connectivity platform 610, device registration service (DRS) 612. The SIM provider 606 manufactures SIMs, provisions the SIM with Ki via step 618. The SIM provider 606 shares the feed containing SIM information such as Integrated Circuit Card Identifier (ICCID) or International mobile subscriber identity (IMSI) and secret key Ki of one or more SIMs with network provider, which is eventually loaded into the SIM inventory of CMP 610 via step 620.

The IoT Platform 608 may further include IoT provisioning service, IoT Platform and the device 602 may include an application/SDK 401, and a SIM 605. The app/SDK function 601 can be extracted into SDK for use in multiple use cases.

The system used to implement the process described herein is illustrated in FIG. 5 and described in detail in the description accompanying FIG. 5.

In an embodiment, the process for automated secure device registration and provisioning of one or more devices enabled for connectivity over cellular or wireless network is described as follows. A customer 614, for example, original equipment manufacturer (OEM), signs up for IoT Platform 608, set up service account with IoT Platform 608. The customer then purchases SIMs from the CMP 610 via step 626. The customer 614 may choose number of SIMs to be ordered and service profile. The CMP 610 assigns an orderID and assigns the ordered number of SIMs to the customer 614 based on order details such as number of SIMs, service profile selection etc.

Similar to the steps described in FIG. 2A, the SIMs assigned to a specific customer are marked for automated secure device registration and provisioning of one or more devices enabled for connectivity over cellular or wireless network for that customer. These SIMs are then activated to work with the default service profile, e.g., profile 1. The purchased SIMs may then be shipped to the customer to be installed in the devices.

The device 602 is assembled to include SIM 605, application/SDK 601 and device itself, and powered up via step 628. The device 602 is then authenticated via cellular authentication via step 630. After success cellular authentication the service in connectivity core 613 sends OTP to device via SMS or NIDD via step 632. The application on the device then invokes API towards DRS to unblock access to IoT Platform via step 642. The application includes OTP in the request payload. The DRS invokes Connectivity Core to validate OTP via step 644. If the OTP is valid then DRS provisions the device in IoT Platform via step 660 similar to the workflows describes in FIGS. 3C and 4C. The IoT Platform returns the access configuration in response. The access configuration may include any one or more of: endpoint (domain name/IP address and port), authentication parameters, etc. The DRS unblocks access to IoT Platform by updating service profile in Connectivity platform via step 664, which in turn updates the service profile for the SIM in Connectivity Core via step 666 and 668. The DRS then responds to the application in the device with IoT Platform access config via step 672. The application then disconnects and reconnects with the access config via step 674.

Figure 7:
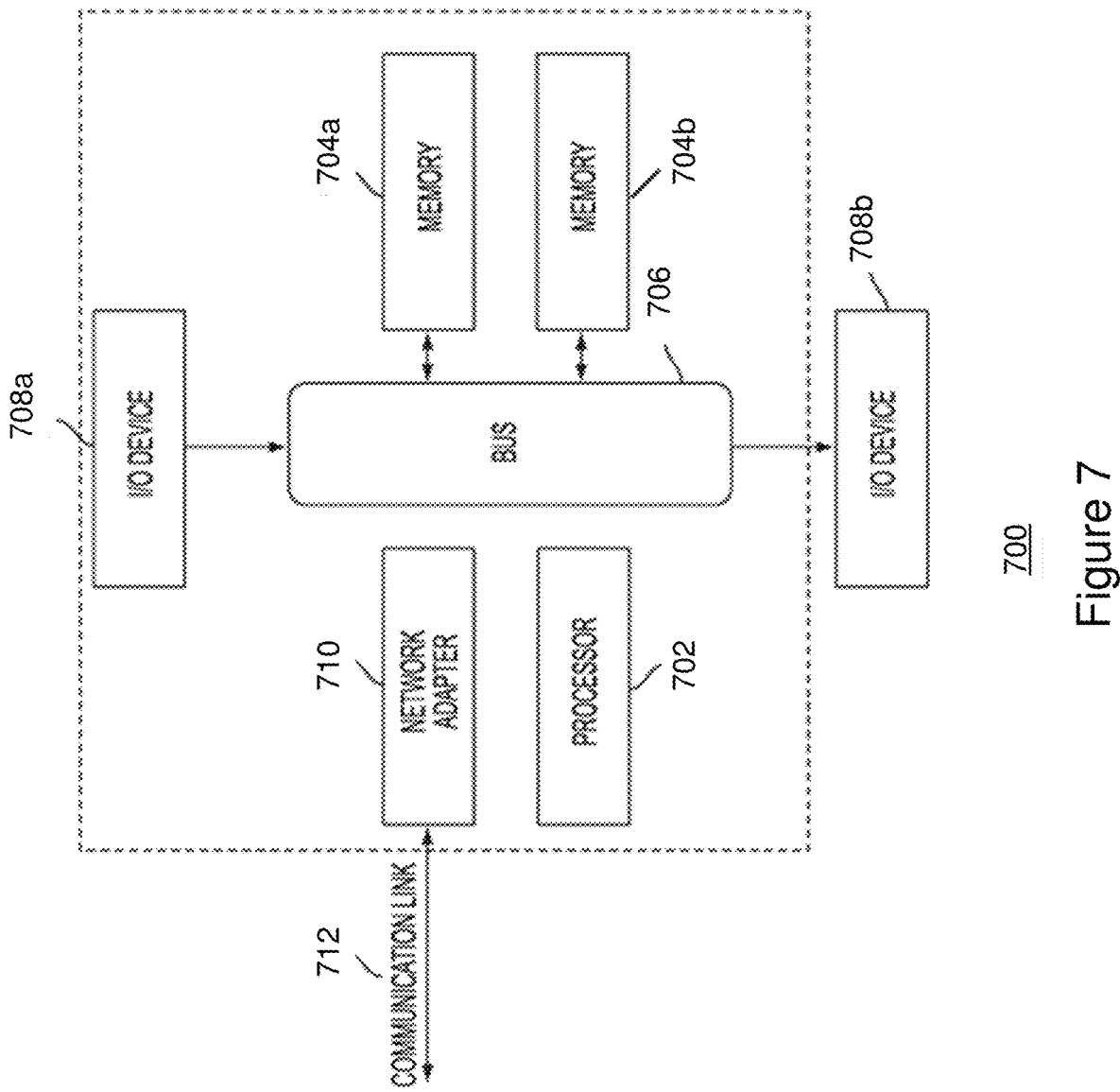
FIG. 7 illustrates a data processing system 700 suitable for storing the computer program product and/or executing program code relating to automated secure device registration and provisioning of one or more devices enabled for connectivity over cellular or wireless network in accordance with one or more embodiments of the present invention.

FIG. 7 illustrates a data processing system 700 suitable for storing the computer program product and/or executing program code in accordance with an embodiment of the present invention. The data processing system 700 includes a processor 702 coupled to memory elements 704a-b through a system bus 706. In an embodiment, the data processing system 700 may include more than one processor and each processor may be coupled directly or indirectly to one or more memory elements through a system bus.

Memory elements 704a-b can include local memory employed during actual execution of the program code, bulk storage, and cache memories that provide temporary storage of at least some program code in order to reduce the number of times the code must be retrieved from bulk storage during execution. As shown, input/output or I/O devices 708a-b (including, but not limited to, keyboards, displays, pointing devices, etc.) are coupled to the data processing system 700. I/O devices 708a-b may be coupled to the data processing system 700 directly or indirectly through intervening I/O controllers (not shown).

In FIG. 7, a network adapter 710 is coupled to the data processing system 702 to enable data processing system 702 to become coupled to other data processing systems or remote printers or storage devices through communication link 712. Communication link 712 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for automated secure device registration and provisioning of one or more devices enabled for connectivity over cellular network comprises:

receiving subscriber identity module (SIM) information for at least one SIM from a SIM provider;

enabling the at least one SIM for restricted connectivity;

receiving SIM information from one or more devices, wherein the SIM information includes an Integrated Circuit Card Identifier (ICCID) and an International mobile subscriber identity (IMSI) for each of the one or more devices;

authenticating the one or more devices using a pre-shared key for each of the one or more devices;

obtaining device information from the each of the one or more devices, wherein the device information comprises an international mobile equipment identity (IMEI) for each of the one or more devices;

associating at least one of the one or more devices with the SIM information received from the one or more devices;

automatically provisioning the authenticated one or more devices using the SIM information received from the one or more devices and the device information; and enabling the one or more devices for general connectivity over cellular network.

2. The method of claim 1, wherein the device information further includes one or more of: a device identifier of the one or more devices, or make and model of the one or more devices.

3. The method of claim 1, wherein the secure device registration and provisioning further comprises using a secure element (SE) in combination with the at least one SIM.

4. The method of claim 3, wherein the secure element (SE) used in combination with the at least one SIM includes an embedded SE or removable SE.

5. The method of claim 1, wherein the secure device registration and provisioning comprises provisioning of the one or more devices in an IoT platform and configuring the one or more devices with the IoT platform access configuration.

6. A system for automated secure device registration and provisioning of one or more devices enabled for connectivity over cellular network, wherein the system comprises:

one or more devices enabled for connectivity; at least one subscriber identity module (SIM); and a device registration service comprising at least one processor and memory, wherein the device registration service is configured to:

receive subscriber identity module (SIM) information for the at least one SIM from a SIM provider;

enable the at least one SIM for restricted connectivity;

receive SIM information from one or more devices, wherein the SIM information includes an Integrated Circuit Card Identifier (ICCID) and an International mobile subscriber identity (IMSI) for each of the one or more devices;

authenticate the one or more devices using a pre-shared key for each of the one or more devices;

obtain device information from the each of the one or more devices, wherein the device information comprises an international mobile equipment identity (IMEI) for each of the one or more devices;

associate at least one of the one or more devices with the SIM information received from the one or more devices;

automatically provision the authenticated one or more devices using the SIM information received from the one or more devices and the device information; and enable the one or more devices for general connectivity over cellular network.

7. The system of claim 6, wherein the device information further includes one or more of: a device identifier of the one or more devices, or make and model of the one or more devices.

8. The system of claim 6, wherein the secure device registration and provisioning further comprises using a secure element (SE) in combination with the at least one SIM.

9. The system of claim 8, wherein the secure element (SE) used in combination with the at least one SIM includes an embedded SE or removable SE.

10. The system of claim 6, wherein the secure device registration and provisioning comprises provisioning of the one or more devices in an IoT platform and configuring the one or more devices with the IoT platform access configuration.

11. A computer program product stored on a non-transitory computer readable medium for automated secure device registration and provisioning of one or more devices enabled for connectivity over cellular network, comprising computer readable instructions which, when executed by a computer, cause the computer to control an execution of an application for device registration and provisioning of one or more devices enabled for connectivity by:

receiving subscriber identity module (SIM) information for at least one SIM from a SIM provider;

enabling the at least one SIM for restricted connectivity;

receiving SIM information from one or more devices, wherein the SIM information includes an Integrated Circuit Card Identifier (ICCID) and an International mobile subscriber identity (IMSI) for each of the one or more devices;

authenticating the one or more devices using a pre-shared key for each of the one or more devices;

obtaining device information from the each of the one or more devices, wherein the device information comprises an international mobile equipment identity (IMEI) for each of the one or more devices;

associating at least one of the one or more devices with the SIM information received from the one or more devices;

automatically provisioning the authenticated one or more devices using the SIM information received from the one or more devices and the device information; and enabling the one or more devices for general connectivity over cellular network.

12. The computer program product of claim 11, wherein the device information further includes one or more of: a device identifier of the one or more devices, or make and model of the one or more devices.

13. The computer program product of claim 11, wherein the secure device registration and provisioning further comprises using a secure element (SE) in combination with the at least one SIM.

14. The computer program product of claim 13, wherein the secure element (SE) used in combination with the at least one SIM includes an embedded SE or removable SE.

15. The computer program product of claim 11, wherein the secure device registration and provisioning comprises provisioning of the one or more devices in an IoT platform and configuring the one or more devices with the IoT platform access configuration.

\* \* \* \* \*